United States Patent [19]

Morishita et al.

[11] Patent Number: 5,039,926
[45] Date of Patent: Aug. 13, 1991

[54] MOTORIZED POWER STEERING APPARATUS

[75] Inventors: Mitsuharu Morishita; Shinichi Kohge; Kazuhisa Nishino, all of Himeji, Japan

[73] Assignee: Mitsubishi Denki K.K., Tokyo, Japan

[21] Appl. No.: 591,162

[22] Filed: Oct. 1, 1990

[30] Foreign Application Priority Data

Oct. 3, 1989 [JP] Japan .................................. 1-259282

[51] Int. Cl.$^5$ .............................................. B62D 5/00
[52] U.S. Cl. .................................... 318/434; 180/79.1
[58] Field of Search ............... 318/434, 139, 257, 185; 361/23, 29, 31, 33, 86, 79, 90, 91; 180/79.1, 140–142

[56] References Cited

U.S. PATENT DOCUMENTS

| | | | |
|---|---|---|---|
| 4,028,597 | 6/1977 | Delaney et al. | 318/139 X |
| 4,471,278 | 9/1984 | Matouka | 318/257 X |
| 4,532,567 | 7/1985 | Kade | 318/434 X |
| 4,660,671 | 4/1987 | Behr et al. | 180/142 |
| 4,736,810 | 4/1988 | Morishita et al. | 180/79.1 |
| 4,739,236 | 4/1988 | Burkenpas | 318/85 |
| 4,757,869 | 5/1989 | Morishita et al. | 180/79.1 |
| 4,828,060 | 7/1988 | Drutchas et al. | 180/79.1 |

FOREIGN PATENT DOCUMENTS 3414346  4/1985  Fed. Rep. of Germany.
3732864  6/1988  Fed. Rep. of Germany.

Primary Examiner—William M. Shoop, Jr.
Assistant Examiner—A. Jonathan Wysocki
Attorney, Agent, or Firm—Sughrue, Mion, Zinn, Macpeak & Seas

[57] ABSTRACT

A motorized power steering apparatus is equipped with a torque sensor including a primary potentiometer for detecting a steering torque applied to the steering wheel by a driver. The torque sensor further includes an auxiliary potentiometer so as to detect variations in the output voltage of a constant voltage power supply to the potentiometers. When there is a difference between the outputs of the primary and auxiliary potentiometers which is greater than a prescribed level, a fail-safe relay is turned off to nullify the power steering operation of a motor. When the output voltage of the power supply for supplying a constant voltage to the primary and auxiliary potentiometers drops below or rises above a predetermined level, the output voltage of the auxiliary potentiometer, which is not used for power steering control, is raised. This increases the difference between the output voltages of the potentiometers to a detectable level, whereby a fail-safe operation is carried out to nullify the power steering operation of the electric motor. Thus, the steering wheel is prevented, in a reliable manner, from being turned spontaneously or unintentionally against the driver's will due to variations in the neutral point of the torque sensor resulting from fluctuations in the voltage supplied thereto.

3 Claims, 3 Drawing Sheets

MOTORIZED POWER STEERING APPARATUS

BACKGROUND OF THE INVENTION

The present invention relates a motorized power steering apparatus for power assisting the steering of a motor vehicle through the rotating force of a motor.

Conventionally, in this type of power steering apparatus, for the purpose of detecting a steering torque, a steering-torque to displacement converter is provided for converting the steering torque applied to a steering wheel by a driver into a twisting displacement of a torsion bar. A potentiometer is mounted on the converter so that it converts the displacement output of the converter into an electric signal with one half of the source voltage for the potentiometer being made as the neutral point for the steering torque.

In order to ensure fail-safe operation of the apparatus in the case of a failure in the potentiometer, it is a general trend to employ another potentiometer, so that the output signal of one of the two potentiometers is utilized as a primary signal for controlling the apparatus. The output signal of the other potentiometer is used as an auxiliary signal for comparison with the primary signal. When the difference between the primary signal and the auxiliary signal is greater than a prescribed level, a control unit determines that the potentiometers are abnormal. It thereafter performs a fail-safe operation whereby a fail-safe relay is turned off to deenergize a power steering motor and an electromagnetic clutch which controls transmission of a power steering torque from the motor toward steerable road wheels.

With the above-mentioned conventional apparatus, however, the power source for the potentiometers, which act as a torque sensor, is a constant voltage power source which is commonly utilized as a power supply to other electronic elements such as a microcomputer incorporated in the control unit. Accordingly, from an economical point of view, it is general practice to supply power to the primary and auxiliary potentiometers from the common power source through a buffer.

As a result, if a failure takes place in which the source voltages for the primary and auxiliary potentiometers concurrently drop for some reason, the voltage at the neutral point of each potentiometer falls or rises. This causes the primary potentiometer to generate an erroneous signal indicative of a steering torque being applied to the steering wheel by the driver even if there is actually no steering torque applied.

In this kind of failure, however, the output signals of the primary and auxiliary potentiometers concurrently fall or rise, so there will be no appreciable difference therebetween. As a result, the control unit determines that there are no abnormalities in the potentiometers, and hence it does not perform any fail-safe operation, allowing an erroneous and improper power steering operation due to the motor.

SUMMARY OF THE INVENTION

The present invention is intended to obviate the above-described problems, and has for its object the provision of a motorized power steering apparatus which is able to prevent the steering wheel from being unintentionally turned due to a change in the neutral points of potentiometers resulting from variations in the output voltage of the power supply to the potentiometers.

In order to achieve the above object, according to the present invention, there is provided a motorized power steering apparatus comprising:
- a steering-torque to displacement converter for converting a steering torque applied to a steering wheel into a displacement;
- a torque sensor including a primary potentiometer and an auxiliary potentiometer for converting the displacement output of the steering-torque to displacement converter into a corresponding electrical signal;
- a constant voltage power source for supplying a constant voltage to the primary and auxiliary potentiometers;
- an electric motor being driven to power assist the steering of the driver in accordance with the magnitude and direction of the steering torque sensed by the torque sensor; and
- a control unit being operable to interrupt the power assistance of the electric motor when it is determined that the output voltage of the constant voltage power source falls below a prescribed voltage level or rises above a prescribed voltage level.

Preferably, the motorized power steering apparatus further includes an electromagnetic clutch for controlling the transmission of an assistant torque from the motor toward steerable road wheels; and a fail-safe relay for interrupting, when turned off, the power supply to the electric motor and the electromagnetic clutch. In this case, the control unit operates to turn off the fail-safe relay when it determines that there is a difference between the outputs of the primary and auxiliary potentiometers which is greater than a prescribed level. The control unit is further operable to turn off at least one of the electric motor, the electromagnetic clutch and the fail-safe relay when it is determined that the output voltage of the constant voltage power source falls below a prescribed voltage level or rises above a prescribed voltage level.

Each of the first and second potentiometers has a power terminal connected to the constant voltage power source, an output terminal connected to the control unit, and a neutral terminal connected to ground.

In one embodiment, the control unit includes:
- an operational amplifier having a negative input terminal, a positive input terminal connected to the output side of the constant voltage power source, and an output terminal connected to the power terminal of each of the potentiometers and to the negative input terminal thereof, so as to form a power source buffer circuit for the first and second potentiometers;
- a first transistor for detecting an abnormal drop in the output voltage of the operational amplifier, the first transistor having a base connected via a first resistor to the output terminal of the operational amplifier, an emitter connected to the output side of the constant voltage power source, and a collector connected through a limiting resistor to a conductor connecting between the output terminal of the auxiliary potentiometer and the control unit; and
- a second transistor for detecting an abnormal rise in the output voltage of the operational amplifier, the second transistor having a base connected via a second resistor to the output side of the constant voltage power source, an emitter connected to the output terminal of the operational amplifier, and a collector connected to the collector of the first transistor.

In the present invention, the control unit determines that the output voltage of the power source for supplying a constant voltage to the primary and auxiliary potentiometers drops below a predetermined level or rises above a predetermined level. After this determination, the control unit raises the output voltage of the auxiliary potentiometer, which is not used for power steering control, so as to increase the difference between the output voltages of the potentiometers to a detectable level. This allows the control unit to perform a fail-safe operation to interrupt the power assistance of the electric motor, i.e., turn off at least one of the electric motor, the electromagnetic clutch, and the fail-safe relay. Thus, the steering wheel is prevented, in a reliable manner, from being turned spontaneously or unintentionally against the driver's will due to variations in the neutral point of the torque sensor resulting from fluctuations in the voltage supplied thereto.

The above and other objects, features and advantages of the present invention will become apparent from the following detailed description of a preferred embodiment of the invention taken in conjunction with the accompanying drawings.

BRIEF DESCRIPTION OF THE DRAWINGS

In the drawings, the same symbols represent the same or corresponding parts.

DESCRIPTION OF THE PREFERRED EMBODIMENT

In the following, a preferred embodiment of a motorized power steering apparatus according to the present invention will now be described with reference to the accompanying drawings.

Figure 1:
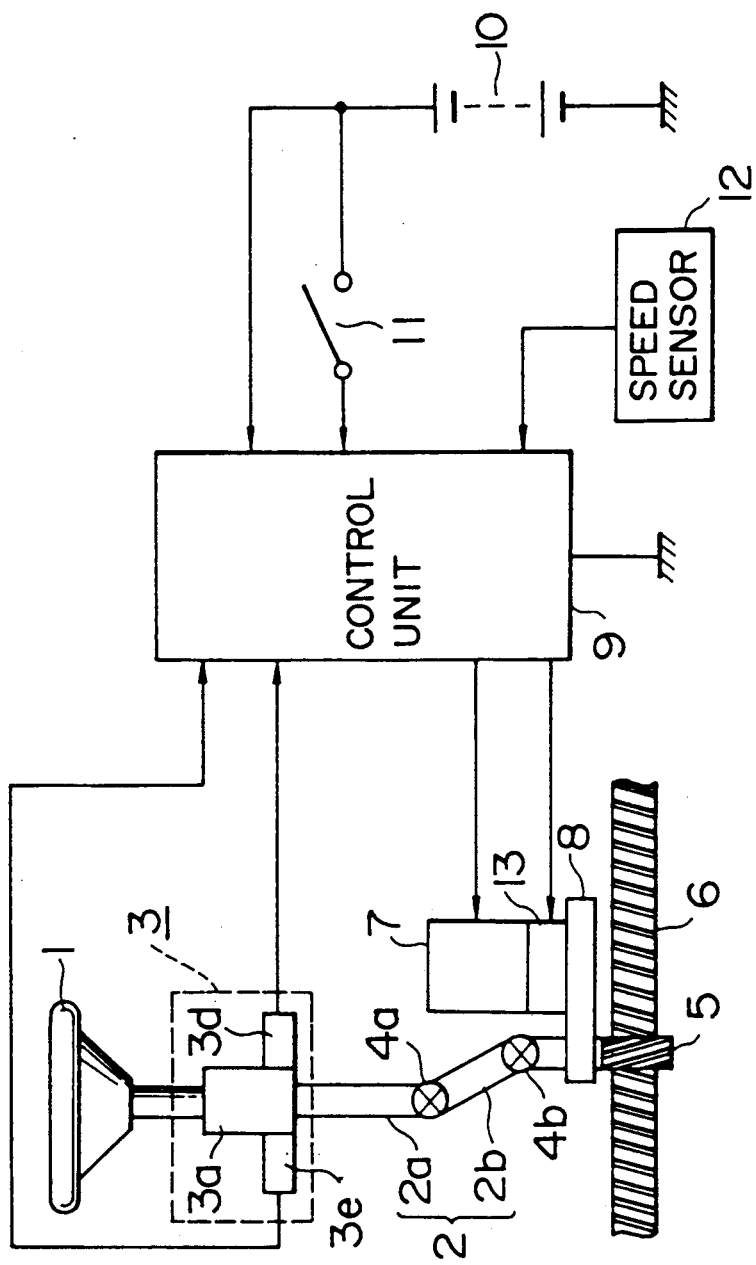
FIG. 1 is a block diagram showing the construction of a motorized power steering system in accordance with one embodiment of the present invention.

In FIG. 1, there is illustrated the overall arrangement of a motorized power steering apparatus in accordance with the present invention. In this figure, a steering wheel 1 is coupled with a steering shaft 2 which includes a first steering shaft section 2a operatively connected with the steering wheel 1 and a second steering shaft section 2b operatively connected with the first steering shaft section 2a through a first universal joint 4a. A torque sensor 3 is mounted on the first steering shaft section 2a for sensing a turning force applied to the steering wheel 1 of a vehicle by a driver and outputting an electrical signal representative of the sensed turning force. The torque sensor 3 comprises a torque-displacement converter 3a which converts a twist angle corresponding to the rotating force applied to the steering wheel 1 into a corresponding quantity of angular displacement, a primary potentiometer 3d which outputs an electric signal to be used for steering control in accordance with the quantity of angular displacement of the torque-displacement converter 3a, and an auxiliary potentiometer 3e which outputs an electric signal for comparison with the electric output signal of the primary potentiometer 3d in accordance with the angular displacement of the torque-displacement displacement converter 3a. A pinion gear shaft 5 is mechanically connected with the second steering shaft section 2b through a second universal joint 4b. A rack shaft 6, which is operatively connected with steerable road wheels (not shown), is in meshing engagement with the pinion gear shaft 5 for turning the steerable road wheels to the right or left in accordance with the turning of the steering wheel 1 in a clockwise or a counterclockwise direction. A DC motor 7 having a shunt winding or a field magnet is operatively connected with the pinion gear shaft 5 through an electromagnetic clutch 13 and a reduction gear 8 so that transmission of a rotative force from the motor 7 to the pinion gear shaft 5 is controlled by the electromagnetic clutch 13 and properly reduced in its rotational speed by the reduction gear 8.

A control unit 9 is powered by a battery 10 through a key switch 11 and connected to receive the outputs of the primary and auxiliary potentiometers 3d, 3e of the torque sensor 3 and the output of a speed sensor 12, which senses the travelling speed of the vehicle, for controlling the operations of the motor 7 and the electromagnetic clutch 13.

Figure 2:
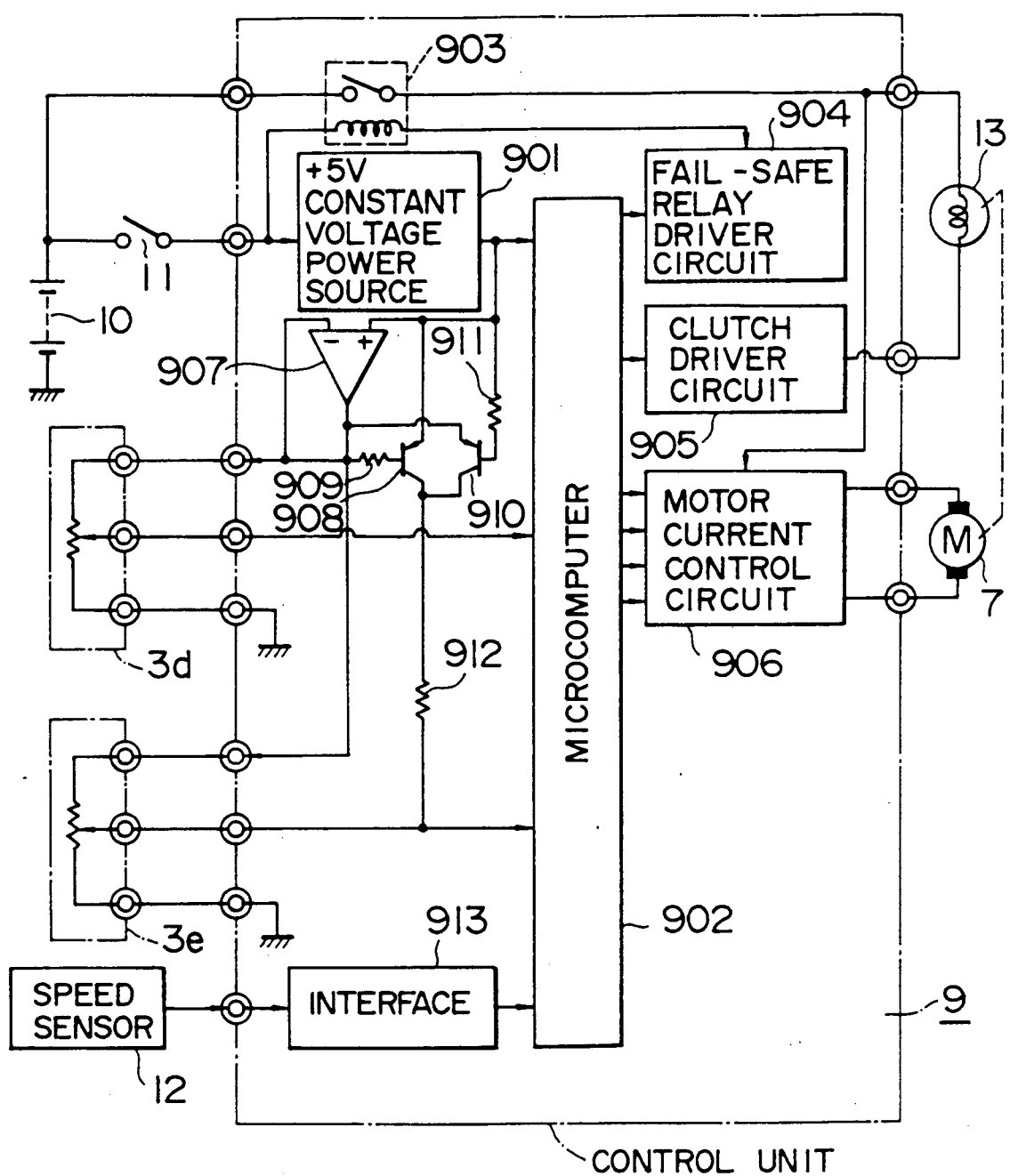
FIG. 2 is a schematic block diagram showing the internal construction of a control unit and its associated elements of the above embodiment.

FIG. 2 is a schematic block diagram showing the interior construction of the control unit 9 and its related portions. In FIG. 2, the control unit 9 includes a constant voltage power source 901 having a constant output voltage of +5 volts for regulating the battery voltage supplied from the battery 10 through the key switch 11 at a constant level of +5 volts, a microcomputer 902, a fail-safe relay 903 which is turned off, upon occurrence of a failure, to cut off the power supply from the battery 10 to the electromagnetic clutch 13 and the DC motor 7, a fail-safe relay driver circuit 904 for driving the fail-safe relay 903 to be turned off when the microcomputer 902 determines that a failure takes place, an electromagnetic clutch driver circuit 905 for turning the electromagnetic clutch 13 on and off in accordance with an instruction from the microcomputer 902, and a motor current control circuit 906 for controlling the flow direction and magnitude of a current flowing through the DC motor 7 in a feedback manner in accordance with an instruction from the microcomputer 902. Each of the first and second potentiometers 3d, 3e has a power terminal connected to the constant voltage power source 901, an output terminal connected to the microcomputer 902, and a neutral terminal connected to ground.

The control unit 9 further includes an operational amplifier 907 which has a positive (+) input terminal supplied with the output voltage of the constant voltage power source 901, and an output terminal connected to a power terminal of each of the potentiometers 3d, 3e and to the negative (−) input terminal thereof, thus forming a power source buffer circuit for the torque sensor potentiometers 3d, 3e, a first transistor 908 in the form of a PNP transistor for detecting an abnormal drop in the output voltage of the operational amplifier 907 (i.e., the supply voltage for the primary and auxiliary potentiometers 3d, 3e), and a second transistor 910 in the form of a PNP transistor for detecting an abnormal rise in the output voltage of the operational amplifier 907. The first transistor 908 has a base connected via a first resistor 909 to the output terminal of the operational amplifier 907, an emitter connected to the output side of the constant voltage power source 901, and a collector connected through a second limiting resistor 912 to a conductor connecting between the output terminal of the auxiliary potentiometer 3e and the microcomputer 902. The second transistor 910 has a base connected via a third resistor 911 to the output side of the constant voltage power source 901, an emitter connected to the output terminal of the operational amplifier 907, and a collector connected to the collector of the first transistor 908. The limiting resistor 912 serves to raise the output voltage of the auxiliary potentiometer 3e to about +5 volts when the transistors 908, 910 are turned on. The control unit 9 also includes a speed signal I/F (interface) circuit 913 for inputting the output signal of the speed sensor 12 to the microcomputer 902.

Figure 3:
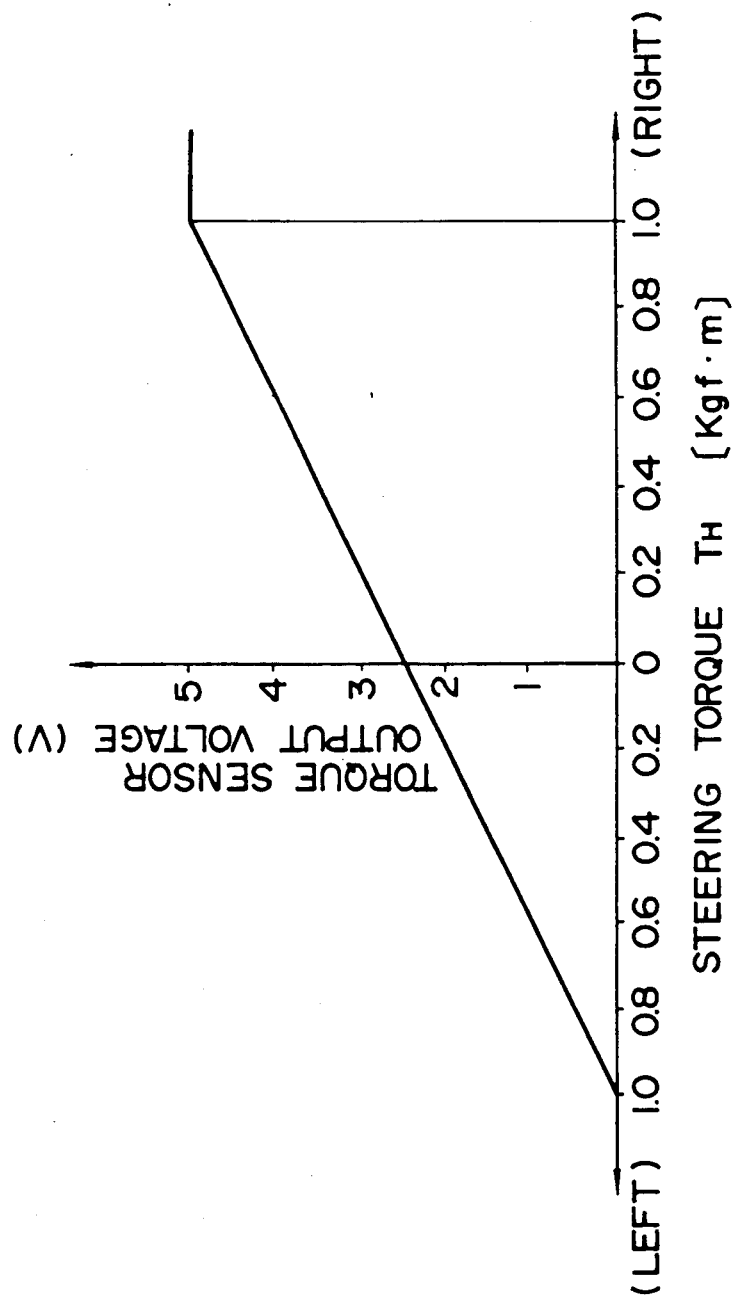
FIG. 3 is a characteristic view showing the relation between the steering torque and the torque sensor output of the above embodiment.

FIG. 3 illustrates the steering-torque versos output-voltage characteristic of each of the potentiometers 3d, 3e of the torque sensor 3.

The operation of this embodiment will now be described. First, when the key switch 11 is turned on for starting the engine, power is supplied from the battery 10 to the constant voltage power source 901 through the key switch 11 of the control unit 9, so a voltage of +5 volts is supplied to every component element of the control unit 9, thus turning on the control unit 9.

As the microcomputer 902 starts to operate, it sends an on signal to the fail-safe relay driver circuit 904 which in turn operates to turn on the fail-safe relay 903, so that the output voltage of the battery 10 is supplied to the electromagnetic clutch 13 and the motor current control circuit 906.

On this occasion, the microcomputer 902 executes a checking program for checking initial abnormalities in the entire system of the apparatus, and if it si determined that there is no abnormality, the microcomputer 902 make the system ready for operation. As this time, the vehicle is standing still, so the speed sensor 12 generates an output signal indicative of the vehicle speed of 0 Km/h.

In this state, if the driver applies a rotating force to the steering wheel 1, each of the primary and auxiliary potentiometers 3d, 3e of the torque sensor 3 generates an output voltage, which has the characteristic as shown in FIG. 3, in accordance with the rotating force of the driver.

Specifically, when there is no steering torque for turning the steering wheel 1 to the right or left, the output voltages of the torque sensor 3 (i.e., the output voltages of the primary and auxiliary potentiometers 3d, 3e) are one half of the voltage (about 5 volts) supplied to the torque sensor 3, i.e., about 2.5 volts.

As the steering torque increases to the right, the output voltage of the torque sensor 3 gradually increases so that it reaches a saturation level of about 5 volts when the steering torque exceeds the force of about 1 Kg×m.

On the other hand, as the steering torque increases to the left, the output voltage of the torque sensor 3 gradually decreases, and it reaches about 0 volts when the steering torque exceeds about 1 Kg×m.

Based on the output voltage of the primary potentiometer 3d and the output signal of the speed sensor 12, the microcomputer 902 calculates an appropriate current for the DC motor 7, and controls the current supply thereto at the calculated level.

As a result, the DC motor 7 is supplied with a current which is controlled by the control unit 9 in the above manner, whereby it generates an assisting torque acting on the steering shaft 2 in the rightward direction, thus alleviating the steering torque required of the driver.

Through a detailed explanation is omitted, the steering to the left is controlled in the manner just opposite to that described above with respect to the rightward steering, reducing the required steering effort of the driver.

Next, the operation of the embodiment when there is an abnormality in the above-described state will be explained. Let us assume that the cable arranged in the vehicle body for connecting the torque sensor 3 and the control unit 9 is harmed or damaged so that the protective sheath for the cable is partially cut to expose the internal conductor, causing a short circuit, or that there arise other failure in wiring or the like which result in current leakage. In such cases, the positive voltage supplied to the potentiometers 3d, 3e begins to decrease when the leakage current increases above the upper voltage level of the operational amplifier 907.

When the voltage drop exceeds a voltage drop in the forward direction between the base and the emitter of the transistor 908, a current is supplied to the base of the transistor 908 and makes it conductive whereby the output voltage of the auxiliary potentiometer 3e is forced to rise by the constant voltage power supply 901 through the resistor 912. As a result, there develops an error voltage which exceeds a prescribed fail-safe detection level, i.e., a prescribed voltage difference between the primary and auxiliary potentiometers 3d, 3e, so the microcomputer 902 determines that the torque sensor 3 is abnormal, and generates an off command to the fail-safe relay driver circuit 904, the electromagnetic clutch driver circuit 905 and the motor current control circuit 906, thereby turning off the fail-safe relay 903 and hence the electromagnetic clutch 13 and the DC motor 7. Thus, there will be no possibility of the steering wheel 1 being automatically or unintentionally turned irrespective of the driver's will.

Incidentally, though a detailed description is omitted, in the event that the source voltage to the primary and auxiliary potentiometers 3d, 3e is abnormally raised for some reason, the transistor 910 functions to detect such an abnormal voltage rise and similarly performs the fail-safe operation, preventing and unintentional turning of the steering wheel 1 due to the motor 7.

In this embodiment, the transistors 908, 910 are used for detecting an abnormal voltage fall or rise, but a comparator may be employed to provide the same effects.

As described in the foregoing, according to the present invention, when the voltage of the positive power source for supplying the primary and auxiliary potentiometers of the torque sensor abnormally falls or rises for some reason, such an abnormality is detected and the output voltage of the auxiliary potentiometer, which is not directly used for power steering control, is forcedly raised. This causes a difference in the output voltage between the primary and auxiliary potentiometers to increase to a level at which a fail-safe operation can be made, whereby the control unit determines the torque sensor to be abnormal and performs a fail-safe operation. As a result, a highly reliable apparatus is provided which is able to prevent spontaneous or unintentional turning of the steering wheel due to a drift of a neutral point which would otherwise result from variations in the voltage supplied to the torque sensor.

What is claimed is:

1. A motorized power steering apparatus comprising:

a steering-torque to displacement converter for converting a steering torque applied to a steering wheel into a displacement output;

a torque sensor including a primary potentiometer and an auxiliary potentiometer for converting the displacement output of the steering-torque to displacement converter into a corresponding electrical signal;

a constant voltage power source for supplying a constant output voltage to the primary and auxiliary potentiometers;

an electric motor driven to power assist the steering of a driver in accordance with the magnitude and direction of the steering torque sensed by the torque sensor; and a control unit operable to interrupt the power assistance of the electric motor both when it is determined that the constant output voltage of the constant voltage power source falls below a prescribed first voltage level and when it is determined that the constant output voltage rises above a second prescribed voltage level, in order to prevent unintentional wheel turning caused by variations in said output voltage supplied to said potentiometers.

2. A motorized power steering apparatus as claimed in claim 1, further comprising:

an electromagnetic clutch for controlling transmission of an assistant torque from the motor toward steerable road wheels; and a fail-safe relay for interrupting, when turned off, the power supply to the electric motor and the electromagnetic clutch;

the control unit being operable to turn off the fail-safe relay when it determines that there is a difference between the outputs of the primary and auxiliary potentiometers which is greater than a prescribed level, the control unit being further operable to turn off at least one of the electric motor, the electromagnetic clutch and the fail-safe relay when it is determined that the output voltage of the constant voltage power source falls below a prescribed voltage level or rises above a prescribed voltage level.

3. A motorized power steering apparatus as claimed in claim 1 or 2, wherein each of the primary and auxiliary potentiometers has a power terminal connected to the constant voltage power source, an output terminal connected to the control unit, and a neutral terminal connected to ground, and the control unit includes:

an operational amplifier having a negative input terminal, a positive input terminal connected to the output side of the constant voltage power source, and an output terminal connected to the power terminal of each of the potentiometers and to the negative input terminal thereof, so as to form a power source buffer circuit for the primary and auxiliary potentiometers;

a first transistor for detecting an abnormal drop in the output voltage of the operational amplifier, the first transistor having a base connected via a first resistor to the output terminal of the operational amplifier, an emitter connected to the output side of the constant voltage power source, and a collector connected through a limiting resistor to a conductor connecting between the output terminal of the auxiliary potentiometer and the control unit; and a second transistor for detecting an abnormal rise in the output voltage of the operational amplifier, the second transistor having a base connected via a second resistor to the output side of the constant voltage power source, an emitter connected to the output terminal of the operational amplifier, and a collector connected to the collector of the first transistor.

* * * * *